Nov. 10, 1953     R. J. STUART ET AL     2,658,423
CUTTER SPINDLE AND FEED MECHANISM THEREFOR
Original Filed Feb. 16, 1948     2 Sheets-Sheet 1
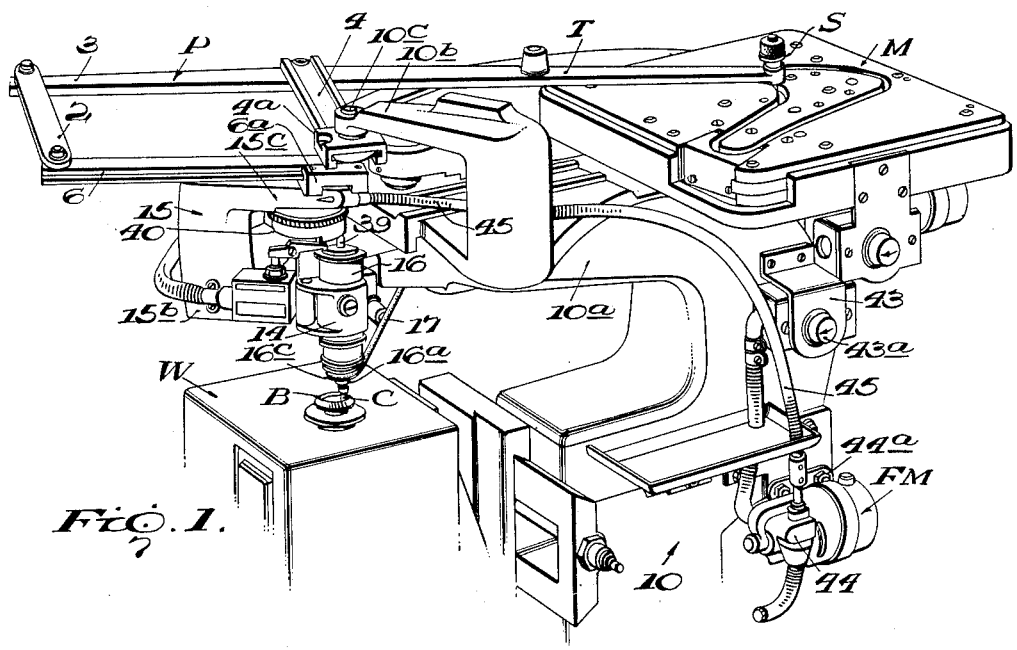
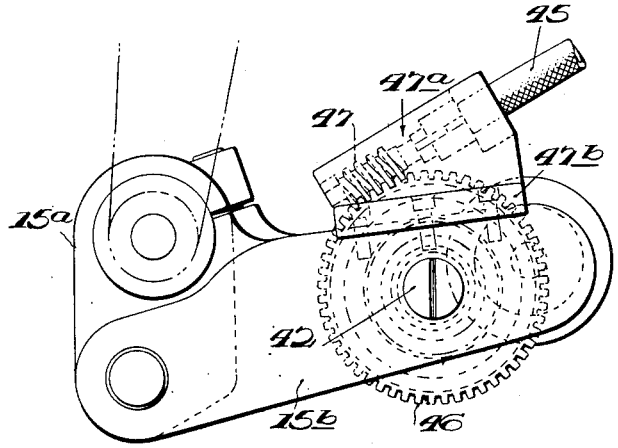
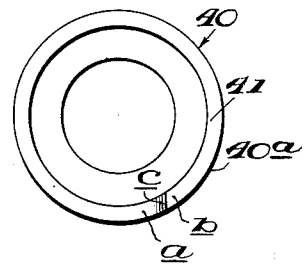
INVENTORS:
Robert J. Stuart
Allen D. Gunderson
BY Peck & Peck
ATTORNEY

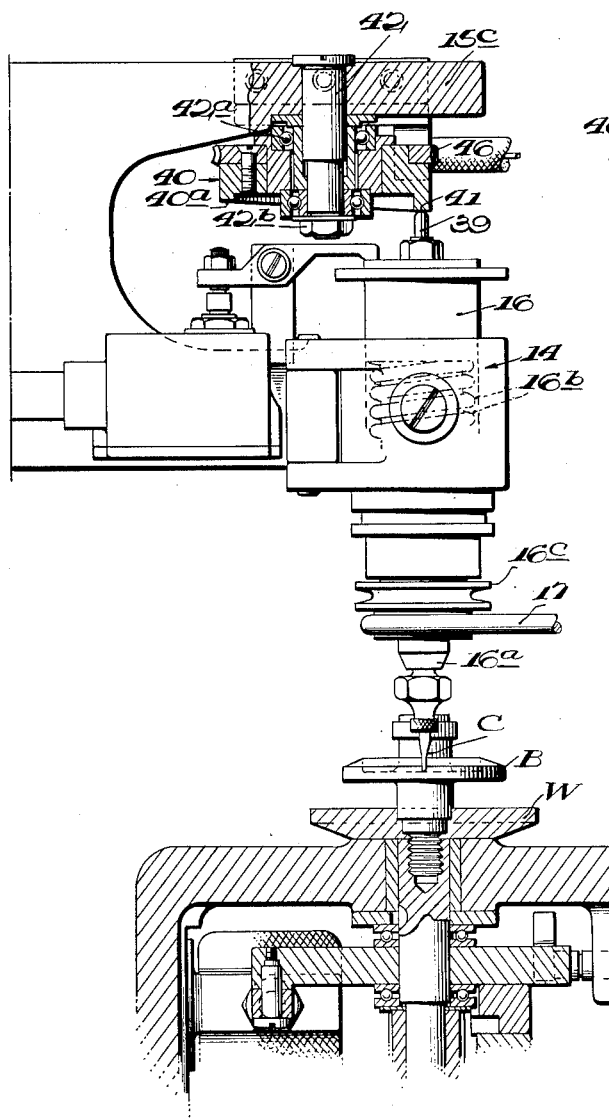
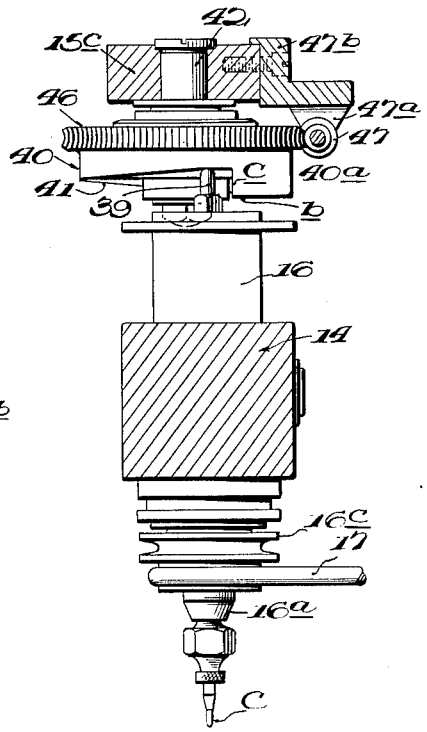

Patented Nov. 10, 1953

2,658,423

UNITED STATES PATENT OFFICE 2,658,423

CUTTER SPINDLE AND FEED MECHANISM THEREFOR

Robert J. Stuart, Waukegan, Ill., and Allen D. Gunderson, Racine, Wis., assignors to George Gorton Machine Co., Racine, Wis., a corporation of Wisconsin Original application February 16, 1948, Serial No. 8,496. Divided and this application May 21, 1951, Serial No. 227,494

2 Claims. (Cl. 90—14)

Our invention relates to certain improvements in cutter spindles and feed mechanism therefor, and more specifically to powered feed mechanisms for progressively feeding a rotary cutter spindle axially toward a work piece during lateral movements of the spindle over the work piece; and the nature and objects of the invention will be readily recognized by those skilled in the art in light of the following explanation and detailed description of the accompanying drawing illustrating what we now consider to be one preferred embodiment of our invention from among various embodiments, adaptations, forms, arrangements and combinations of which the invention is capable within the broad spirit and scope thereof.

This application is filed as division of our copending parent application Serial No. 8,496, filed February 16, 1948, for Apparatus for the Production of Integral Blade Turbine Wheels and the Like Units.

An object of our invention is to provide for progressively feeding a rotary cutter into a work piece as the cutter is laterally moved over the work piece in lateral cutting engagement therewith.

A further object is to provide structurally simple and mechanically efficient powered mechanism for automatically progressively feeding a rotary cutter to a predetermined depth of cut in a work piece.

Another object is to provide mechanism adapted to be mounted on and carried by a universally laterally movable supporting structure mounting thereon an axially movable cutter spindle, for progressively feeding the spindle toward a work piece during lateral movements of the spindle.

A further object is to provide an efficient mounting and arrangement of a power drive for transmission for such a spindle feed mechanism so mounted and associated with the cutter spindle and its movable supporting structure.

A further object is to provide a power driven cam member for feeding engagement with a universally laterally movable cutter spindle to feed the spindle axially.

A further object is to provide such a cam member which may be readily removed and replaced by another cam member having different spindle feed characteristics.

And another object is to provide an arrangement of powered spindle feed mechanism for feeding mechanically from a remote power unit, a cutter spindle mounted for feeding movements axially on a supporting structure mounted for universal lateral movements.

With the foregoing and various other objects, features and results in view which will be readily recognized from the following detailed description and explanation, our invention consists in certain novel features in design and construction and in combinations and sub-combinations of parts and elements, all as will be more fully referred to and specified hereinafter.

Referring to the accompanying drawings in which similar reference characters refer to corresponding parts and elements throughout the several figures thereof:

Fig. 1 is a view in perspective of a portion of a tracer controlled, pantographic type of engraving or milling machine embodying therein an adaptation of a cutter spindle, cutter spindle mounting and powered cutter spindle feed mechanism of our invention.

Fig. 2 is a view in side elevation of the cutter head, cutter spindle and powered spindle feed mechanism of the machine of Fig. 1, the feed cam and its mounting being shown in vertical section.

Fig. 3 is a view in side elevation showing the cutter spindle and spindle feed cam in their mounted positions on the cutter head and the cutter head supporting link, respectively.

Fig. 4 is a view in top plan showing the mounting of the spindle feed cam and its driving worm and shaft on the cutter head supporting link.

Fig. 5 is a detailed view in bottom plan of the feed cam.

An adaptation of a cutter spindle and powered cutter spindle feed of our invention for progressively feeding a cutter spindle toward and a cutting tool thereon into a work piece as the cutting tool is moved laterally through the work piece in cutting engagement therewith, is shown by way of example as embodied in a tracer controlled, pantographic engraving machine of a particular type. The invention is not, however, limited or restricted to this particular type of machine, or for performing any specific character of work, as broadly the cutter spindle and power feed mechanism combination and organization exemplified by this example is intended and adapted for use in any machine or organization where it may be desired to progressively, automatically feed a laterally movable cutting tool into a work piece during lateral cutting movements of that tool through the work piece.

Referring to Fig. 1 of the drawings, the example machine happens to be of the general tracer controlled, pantographic type illustrated in such U. S. patents as the following, namely, 1,790,581—January 27, 1931; 1,881,500—October 11, 1932; 1,925,036—August 29, 1933; and 2,000,838—May 7, 1935; in that it embodies the same general arrangement and association of a tracer controlled pantograph with a rotary cutter spindle mounted in a pivoted link supported cutter head for universal lateral movements by the movements of the pantograph in tracing a pattern to thereby universally laterally move a cutting tool in cutting relation through a work piece.

A portion of a machine of such general type is illustrated herein, and includes a vertically disposed column structure 10, the upper portion only of which is shown. At the forward side of column 10 there is provided any suitable work holding means or table identified generally in Fig. 1 by the reference character W. A cutter head 14 is supported in position over and above work table W on the outer end of a supporting link structure identified generally by the reference character 15 (see U. S. Patent 2,000,838 referred to above) for universal lateral movements of the cutter head in a horizontal plane over the work table. The supporting link structure 15 is comprised of a link 15a which is pivotally mounted on and supported from a rigid, horizontally disposed arm structure 10a on and extending forwardly from the upper end of the column structure 10, and a link 15b pivotally coupled to the forward end of link 15a. The cutter head 14 is mounted in vertically disposed position at the outer, free end of such link 15b. A rotary cutter spindle unit 16 is mounted in cutter head 14 and includes the rotary cutter spindle 16a journalled therein in vertically disposed position and movable as a unit therewith. Cutter spindle unit 16 is itself mounted in vertically disposed position in cutter head 15 for vertical sliding movements axially therein to raise and lower the unit with the cutter spindle 16a toward and from the work table W to thereby move a suitable cutting tool, such as a milling cutter C to and from cutting engagement with a work piece B on table W. This cutter spindle unit 16 is in this example spring loaded by a spring 16b which acts to continuously bias the cutter spindle 16a in a direction to move the cutter spindle from cutting relation with a work piece B on the table W. The mounting and spring loading of the cutter spindle 16a in the cutter spindle unit 16 is in general accord with the established practice for mounting the cutter spindle in this type of machine, as exemplified for example in the U. S. patents referred to above, and in such U. S. Patents as Nos. 1,750,594—March 11, 1930, and 2,128,611—August 30, 1938.

A pantograph linkage P is mounted in horizontally disposed position above the cutter head 14 and the cutter spindle unit 16 therein. Pantograph P is pivotally hung or suspended from a rigid supporting arm 10b which is mounted on rigid supporting structure 10a of the column 10. Pantograph P is comprised of the sets of parallel bars or links 2 and 4, and 3 and 6, respectively, and is pivotally mounted and suspended from arm 10b by a pivotal connection 10c between the arm 10b and a slider block 4a which is mounted on and which slidably adjustably receives the pantograph link 4. The movement reducing bar or link 6 is pivotally coupled with the upper side of the link 15b of the cutter head supporting link structure 15 by a slider block 6a which is pivotally mounted on link 15b in position above but in axial alignment with cutter spindle 16a. The pivoted slider block 6a adjustably receives therein and mounts the link 6 of pantograph P.

Link 3 of pantograph P is extended longitudinally to provide the tracer arm T which mounts at its outer free end a stylus S for scanning or tracing engagement over a suitable pattern or master. It so happens that in the example machine a power driven master M is provided with which stylus S is connected and by which stylus S is caused to be moved around an endless profile path provided by the master unit. Our invention is not limited to the use of a power driven master unit as the stylus S on the tracer arm T may be manually operated to scan a pattern or master. In whatever manner stylus S is caused to trace a pattern, such tracing movements thereof will be transmitted to the pantograph linkage P by tracer arm T. Such movements of the tracer arm will in turn be transmitted by the pantograph through link 6 thereof and the slide block 6a, to the cutter head supporting link structure 15 and to the cutter spindle unit 16 mounted in the link 15b as movements laterally of the spindle 16a in accurately reduced scale to the movements laterally of stylus S in following a pattern.

In the example machine the cutter spindle 16a mounts a spindle driving pulley 16c thereon at the lower end thereof and a suitable belt drive is provided which includes a belt 17 engaged over and in driving relation with the spindle pulley 16c. It is not considered necessary to disclose herein in detail such belt drive beyond the illustrated portion of the belt 17 as such a drive is old and well known and may be considered to be of the general types disclosed in the U. S. Patents Nos. 1,790,581—January 27, 1931, and 1,925,036—August 29, 1933.

In accordance with out invention we provide for automatically feeding the cutter spindle 16a toward the work table W as the cutter spindle is universally laterally moved thereover by the pantograph linkage P to thereby feed a cutting tool C into a work piece B on table W as such cutting tool is moved laterally in cutting relation through the work piece. Following the teachings of our invention, such progressive feeding of the cutter spindle 16a may include periods in which the feed axially of the cutter C by the cutter spindle into the work piece is arrested but the period of feed and the period or periods of arrestation of feed, if any, are in the particular example hereof, preferably carried out and performed in a single automatic cycle.

The cutter spindle 16a is continuously biased by the spring 16b in a direction to move the spindle and a cutter C thereon away from a work piece B on table W. Cutter spindle 16a is only moved toward the work piece B by the application of forces to the spindle unit 16 of a magnitude to overcome the spring loading provided by the spring 16b. In the example adaptation of the invention, the outer or upper end of spindle unit 16 is provided with an upstanding member such as the pin 39. This pin 39 is axially disposed relative to the unit 16 and to the depending cutter spindle 16a at the opposite end of the unit. Pin 39 provides by its upper end the point at which spindle feeding forces may be efficiently applied to the spindle unit 16 to move that unit downwardly and inwardly through its mounting in the cutter head 14 in order to thereby move cutter spindle 16a and a cutter C mounted thereon into operative cutting engagement with a work piece B mounted on table W.

The feeding of the cutter spindle 16a and its cutter C is, by our invention, carried out automatically by an organization which has taken a form in the present example, in which a power driven cam member 40 is rotated with the cam surface 41 thereof continuously engaged by the upper end of the pin 39 of spindle unit 16, so that such pin functions as a cam follower under the action of the biasing spring 16b of spindle unit 16. Referring now to Figs. 2, 3, 4 and 5, the cam member 40 is in the form of a circular disc having a peripheral flange 40a therearound at the inner or under side thereof, with the inner annular edge of this flange providing the annular cam surface 41 concentric with the axis of rotation of the cam. By our invention, we mount the cam member 40 on the link 15b of the supporting linkage 15 in a position above cutter spindle unit 16 and the actuating pin 39 thereof so that the cam surface 41 will be continuously engaged by pin 39 as the cam is rotated about an axis parallel with but radially offset from the vertical or longitudinal axis of cutter unit 16 and the cutter spindle 16a therein mounted.

In the specific example apparatus hereof, the link 15b of the cutter head supporting link structure 15 is provided with an over arm 15c which extends outwardly over and across and which is spaced from the cutter head 14 and the outer or upper end of the cutter spindle unit 16 and its actuating pin or cam follower 39 (see Figs. 2 and 4). The feed cam 40 is mounted from this over arm 15c between such arm and the cutter spindle unit 16, on a stud shaft 42. This shaft 42 is mounted in fixed position on and extends inwardly from the over arm 15c with its longitudinal axis parallel with but offset radially a distance inwardly from the longitudinal axis of the cutter spindle unit 16 and its actuating pin 39. The feed cam 40 is journaled and confined on the inwardly extended length of shaft 42 by a suitable annular anti-friction bearing assembly 42a. The cam 40 and its bearing assembly 42a are preferably removably mounted and confined in position on shaft 42 by a nut member 42b threaded onto the inner end of the shaft 42. The location and the relative positioning of the shaft 42 and the feed cam 40 thereon, is such that that portion of the cam profile or surface 41 above the pin 39 is aligned with that pin and engaged thereby in slidable, camming contact therewith. As the cam surface 14 is annular and is concentric with the axis of rotation of cam 40 on its mounting shaft 42, it follows that as cam 40 is revolved, the annular cam surface 41 thereof will continuously pass through the plane of the axis of pin 39 for constant engagement of the cam surface 41 by such pin.

The feed cam 40 in this example is power driven from an electric motor FM which, in this instance, is mounted and supported from structure 10 in a location spaced a distance below the master unit M, as will be clear by reference to Fig. 1. Preferably the motor FM is controllable selectively as to the rate of speed of operation thereof through the medium of a rheostat 43 mounted on the column structure above motor FM. The rheostat 43 may be provided with an operating knob 43a in a position readily accessible to the operator. A speed reduction unit 44 is operatively connected with and driven from motor FM and provides a power output or take-off shaft 44a extending upwardly therefrom. Any suitable flexible shafting 45 is connected with the take-off shaft 44a and extends upwardly therefrom and forwardly across column structure 10 and its arm 10a to the over arm 15a of the cutter head supporting link 15b and is coupled in operative driving connection with the feed cam 40.

The feed cam 40, referring particularly to Figs. 3 and 4 of the drawings, is provided with a spiral gear or worm wheel 46 fixed in position thereon and therearound concentric with the cam axis and being located at the side of the cam opposite the annular cam surface 41. A worm 47 is rotatably mounted in a supporting structure 47a which is secured and attached in position by means of a bracket structure 47b attached to link 15b of spindle supporting structure 15, with the worm 47 being positioned thereby tangentially relative to and in mesh with worm wheel 46 on the feed cam 40. The worm 47 is coupled with and driven by the flexible shafting 45 from the motor FM to thereby revolve the feed cam 40. Thus, the feed cam 40 and its power driven transmission which includes the worm wheel 46 and worm 47, are mounted and supported on the universal laterally swingable cutter head supporting linkage 15. By such arrangement and mounting the feed cam 40 with the worm wheel 46, worm 47 and the flexible shaft 45 connected therewith, are movable with the linkage 15 as a unit organization and are maintained constantly in operative engagement throughout all movements laterally of the linkage. The flexible shafting 45 from motor FM to worm 47 freely permits of such movements with a minimum of interference therewith.

The position of a feed cam 40 relative to the cutter spindle unit 16 is such that the maximum outward or upward movement of cutter spindle unit 16 which is permitted by any point on the annular cam surface 41 is less than the maximum, unrestrained outward movement possible to that unit, so that, the biasing spring 16b of the unit will act to effectively maintain the pin 39 biased constantly into engagement with the cam surface.

The annular cam surface 41 is generated to lie in a generally helical or spiral path about the axis of the cam and its mounting shaft 42, from a point or sector on cam surface 41 which when in engagement with pin 39 permits the cutter unit 16 to move upwardly or outwardly under its spring loading to thereby move the cutter C on cutter spindle 16 from cutting engagement with a work piece B, to a point or sector thereon at which the cutter spindle 16 is forced inwardly to position cutter C for its maximum, predetermined depth of cut in the work piece. Referring to Fig. 3, the "low" point or sector on cam surface 41 at which the cutter spindle unit 16 is in position with the cutter C mounted thereon removed from operative engagement with the work piece is indicated at *a*, while the "high" point or sector on cam surface 41 at which the cutter spindle unit 16 is forced inwardly to position the cutter C at maximum depth of cut in the work piece is indicated at *b*. In the particular form of the cam 40 of this example, the points *a* and *b* on cam surface 41 are joined by a straight edge portion *c* of cam flange 40a which is disposed in a plane substantially parallel with the axis of the cam. Hence, when pin 39 reaches point *b* on cam surface 41 movement of the cam 40 to the right or in an anti-clockwise direction will cause pin 39 with cutter spindle 16 to abruptly move from point *b* outwardly or upwardly under the action of spring 16b to engage pin 39 with the low point *a* of the cam surface and thus move cutter C from operative cutting engagement with a work piece B. From the "low" point or sector $a$, cam surface 41 generally, progressively spirals through a relatively flat spiral path around the cam to the "high" point or sector $b$ thereof. Cam 40 is designed to provide the annular cam surface 41 thereof for a complete spindle feeding cycle of the cutter spindle from its starting position to its position of maximum depth of cut in a work piece in one (1) revolution of the cam.

The cam 40 of the instant example has the cam surface 41 thereof designed for controlling automatically in a single revolution of the cam, the feed of the cutter spindle during the cutting or milling out on a work piece B of an integral member having a continuous uninterrupted profile or contour therearound. In the example machine with which this cam 40 is employed, the powered master unit M provides an enlarged scale endless track which is a precise replica of the contour or profile of the integral member to be milled out from the work piece. In this particular form of cam 40, the cam surface 41 is formed so that the "high" sector $b$ thereof provides a "dwell" of the required number of degrees around the cam surface to permit the cutter C to make one or more passes around the integral member which has been milled out from the work piece B. During such passes the inward feed of cutter C has been arrested and the cutter is maintained at the maximum depth of the cut required to form the integral member from the work piece. The sector of the cam surface 41 at such "dwell" is disposed in a plane perpendicular to the axes of the cam 40 and the cutter spindle unit pin 39, so that movement of this "dwell" sector $b$ of the cam surface that is in engagement with pin 39 will not result in any inward feeding movement of the cutter C. Similarly, a "dwell" of the required number of degrees for delaying initiation of the feed of cutter C at the start of a milling cycle may be provided through the required number of degrees through a sector on cam surface 41 beginning at the "low" point $a$ thereof. Such a sector of cam surface 41 has the plane of the surface thereof perpendicular to the axes of the cam 40 and pin 39 of the cutter spindle unit 16. And in similar manner, if desired or found expedient in any particular design of cam 40 for performing a specific cutting operation, a dwell or dwells may be provided on the cam surface 41 at any location or locations intermediate the low point $a$ and the high point $b$.

Other departures from the normal progressive spiral path of cam surface 41, at any desired point or points thereon, may be provided in order to control the feeding movements of the cutter spindle unit 16 to meet any particular conditions which may be encountered in the cutting, milling or engraving of a work piece by the cutter C.

Attention is directed to the fact that due to the removable mounting provided for the feed cam 40, such cam may be readily replaced by a cam of different characteristics for controlling the feed of the cutter spindle unit 16, so that, a wide range of cams may be made available for for interchangeable mounting in the machine or combination of the invention in order that the combination may be operated to cut out, mill or engrave over a wide variety of operations, designs, profiles and contours.

It will also be evident that various other embodiments, modifications, changes, substitutions, eliminations, additions and variations may be resorted to without departing from the basic spirit and scope of our invention, and hence we do not intend or desire to limit our invention to the embodiment and application thereof herein disclosed, or to the exact and specific constructions and arrangements thereof, except as may be required by any intended limitations thereto in any of the appended claims.

What we claim is:

1. In combination; a cutter spindle supporting structure mounted for lateral swinging over a work piece; said supporting structure including a link member pivotally mounted at its inner end and provided at its outer end with spaced, substantially parallel arms; a cutter spindle unit mounted in and disposed transversely through one of said arms with one end of said spindle unit positioned intermediate said arms in the space therebetween and with the opposite, outer end thereof adapted to mount a cutting tool; said cutter spindle unit being also mounted for movements axially toward and from a work piece; a feed cam mounted in position at the inner side of the other of said arms for rotation about an axis parallel with the axis of said spindle unit; said feed cam being provided with an annular cam surface therearound in camming engagement with the end of said spindle unit positioned between said arms for progressively feeding said spindle unit toward a work piece during lateral movements of said unit with said supporting structure; feed cam rotating mechanism mounted on and movable as a unit with said link member in driving connection with said feed cam; and a motor in driving connection with said cam rotating mechanism for effecting power feed of said cutter spindle unit.

2. In the combination defined by claim 1, said feed cam rotating mechanism comprising, a worm wheel mounted on said feed cam concentric with said annular cam surface, a worm supported and journaled on that arm of said spaced arms on which said feed cam is mounted in driving mesh with said worm wheel, and a drive shaft connecting said motor with said worm.

ROBERT J. STUART.
ALLEN D. GUNDERSON.

References Cited in the file of this patent

UNITED STATES PATENTS

| Number | Name | Date |
|---|---|---|
| 1,899,775 | Schnable | Feb. 28, 1933 |
| 2,341,061 | Rhodes et al. | Feb. 8, 1944 |

FOREIGN PATENTS

| Number | Country | Date |
|---|---|---|
| 558,215 | Great Britain | Dec. 24, 1943 |